(12) United States Patent
Huang et al.

(10) Patent No.: US 7,435,018 B2
(45) Date of Patent: Oct. 14, 2008

(54) HIDDEN IMAGE CAPTURING DEVICE

(75) Inventors: Ho-Ching Huang, Taipei (TW);
Kuo-Yang Cheng, Taipei (TW);
Chi-Fen Chang, Taipei (TW); Shu-Hua Lai, Taipei (TW); Chien-Te Li, Taipei (TW); Jian-Ming Peng, Taipei (TW)

(73) Assignee: Inventec Corporation, Taipei (TW)

( * ) Notice: Subject to any disclaimer, the term of this patent is extended or adjusted under 35 U.S.C. 154(b) by 359 days.

(21) Appl. No.: 11/476,011

(22) Filed: Jun. 28, 2006

(65) Prior Publication Data

US 2008/0002965 A1    Jan. 3, 2008

(51) Int. Cl.
*G03B 17/00* (2006.01)

(52) U.S. Cl. .................. 396/419; 396/535; 396/429; 348/373; 348/374; 348/375; 348/376

(58) Field of Classification Search ......... 348/373–376; 396/535, 419
See application file for complete search history.

(56) References Cited

U.S. PATENT DOCUMENTS

| 2004/0245342 A1* | 12/2004 | Cho et al. ............... 235/472.01 |
| 2007/0253703 A1* | 11/2007 | Tsai et al. .................. 396/429 |
| 2008/0085112 A1* | 4/2008 | Lane et al. .................. 396/349 |

* cited by examiner

*Primary Examiner*—W. B. Perkey
*Assistant Examiner*—Fang-Chi Chang
(74) *Attorney, Agent, or Firm*—Rabin & Berdo, P.C.

(57) ABSTRACT

A hidden image capturing device is applied to a display. The hidden image capturing device has a shell, a control module, a slide module, and an image capturing module. The slide module is disposed in the shell and controlled by the control module for sliding. Besides, the slide module enables the image capturing module to extend out or withdraw into the shell when it slides.

10 Claims, 5 Drawing Sheets

HIDDEN IMAGE CAPTURING DEVICE

BACKGROUND OF THE INVENTION

1. Field of Invention

The invention relates to a hidden image capturing device, and more particularly, to a hidden image capturing device used in a display.

2. Related Art

Due to the popularity of the Internet and flat displays, using image capturing devices to capture images and transmitting the images over the Internet have become part of the life. Currently, there are many products that integrate the image capturing device with the flat display. The types of ordinary image capturing devices may be either constant off or constant on.

The so-called "constant off" type of image capturing device refers to the one that needs to be turned on before use and turned off after finish. The "constant on" type of image capturing device refers to the one that is constantly on and standby; therefore, it consumes and wastes power. Moreover, in the current market, the image capturing devices are mostly exposed outside the shell of the flat display, so it affects the appearance and applicability of the display as well.

SUMMARY OF THE INVENTION

The invention discloses a hidden image capturing device applied to displays. The hidden image capturing device comprises a first shell, a control module, a slide module, and an image capturing module.

The slide module is disposed inside the first shell and controlled by the control module for sliding. The slide module enables the image capturing module to extend out or withdraw into the first shell when it slides; therefore, if users are not using the image capturing device, it can be stored and hidden right away. Besides, if an actuating plate is disposed on one side of the slide module, it can move simultaneously with the slide modules; therefore, the actuating plate can be used to control a power switch of the image capturing device, so the goal of power saving is achieved when the image capturing device is not in use.

Accordingly, the invention has at least the following advantages:

1. The hidden image capturing device can be conveniently stored;
2. It saves power when the hidden image capturing device is not in use; and the user can see the status of the hidden image capturing device through a user interface; and
3. The hidden image capturing device enhances the appearance of the display.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
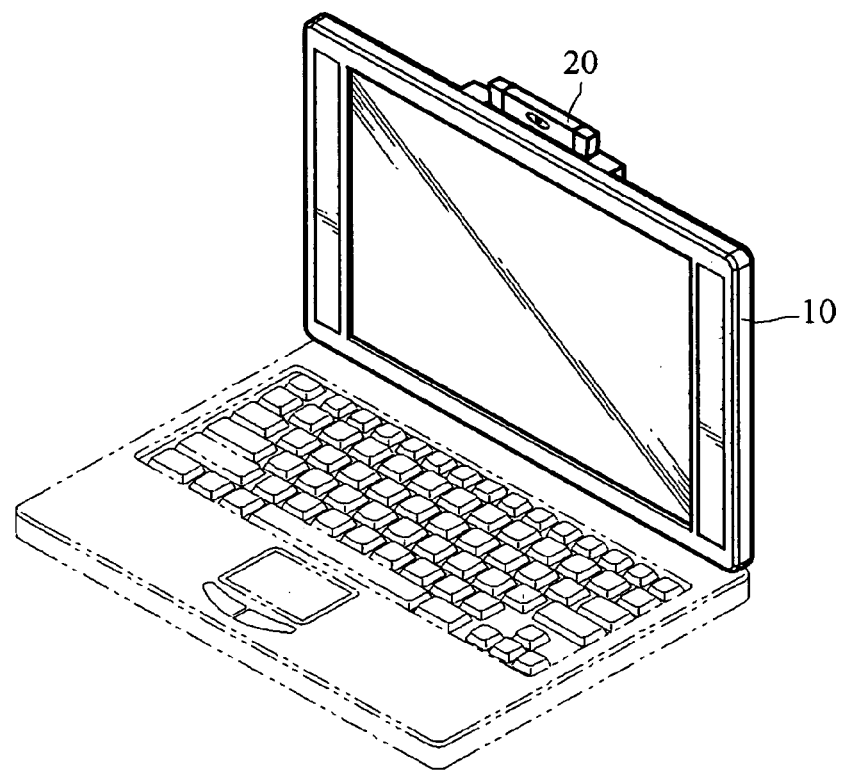
FIG. 1 shows an embodiment of a hidden image capturing device applied to a display, wherein the image capturing module of the hidden image capturing device is in an activation status.
Figure 2:
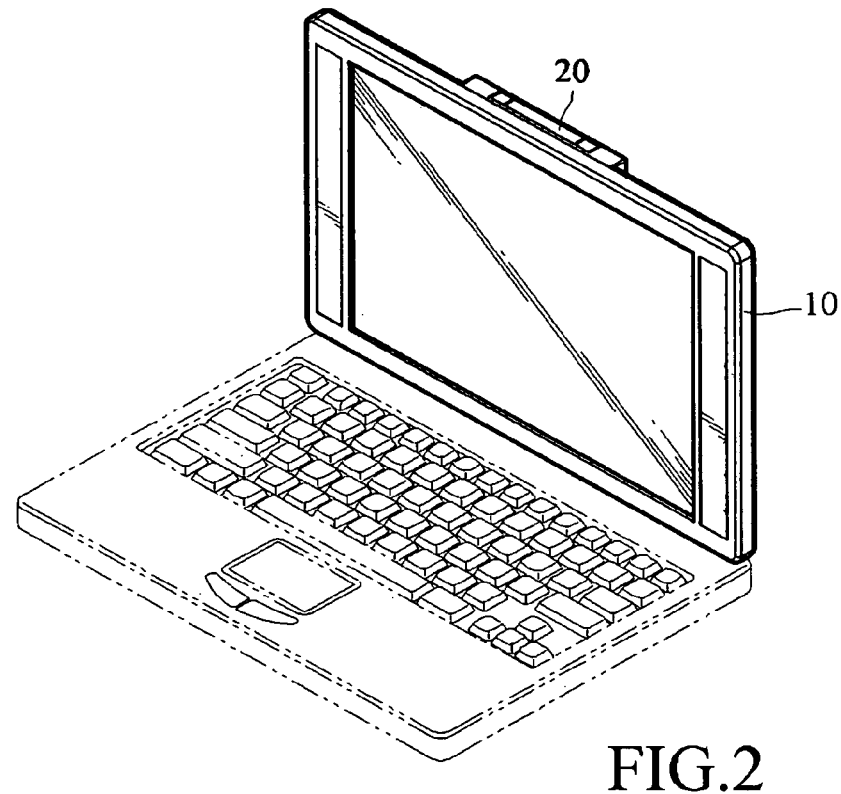
FIG. 2 shows an embodiment of a hidden image capturing device applied to a display, wherein the image capturing module of the hidden image capturing device is in a stored status.

As shown in FIG. 1, a hidden image capturing device applied to a display, wherein the image capturing module of the hidden image capturing device is in an activation status. On the other hand, in FIG. 2, it shows the image capturing module in a stored status. The hidden image capturing device 20 disclosed herein is used in a display 10, particularly to that of a laptop computer. However, it is also applicable to an independent display (not shown) of a desktop computer.

Figure 3:
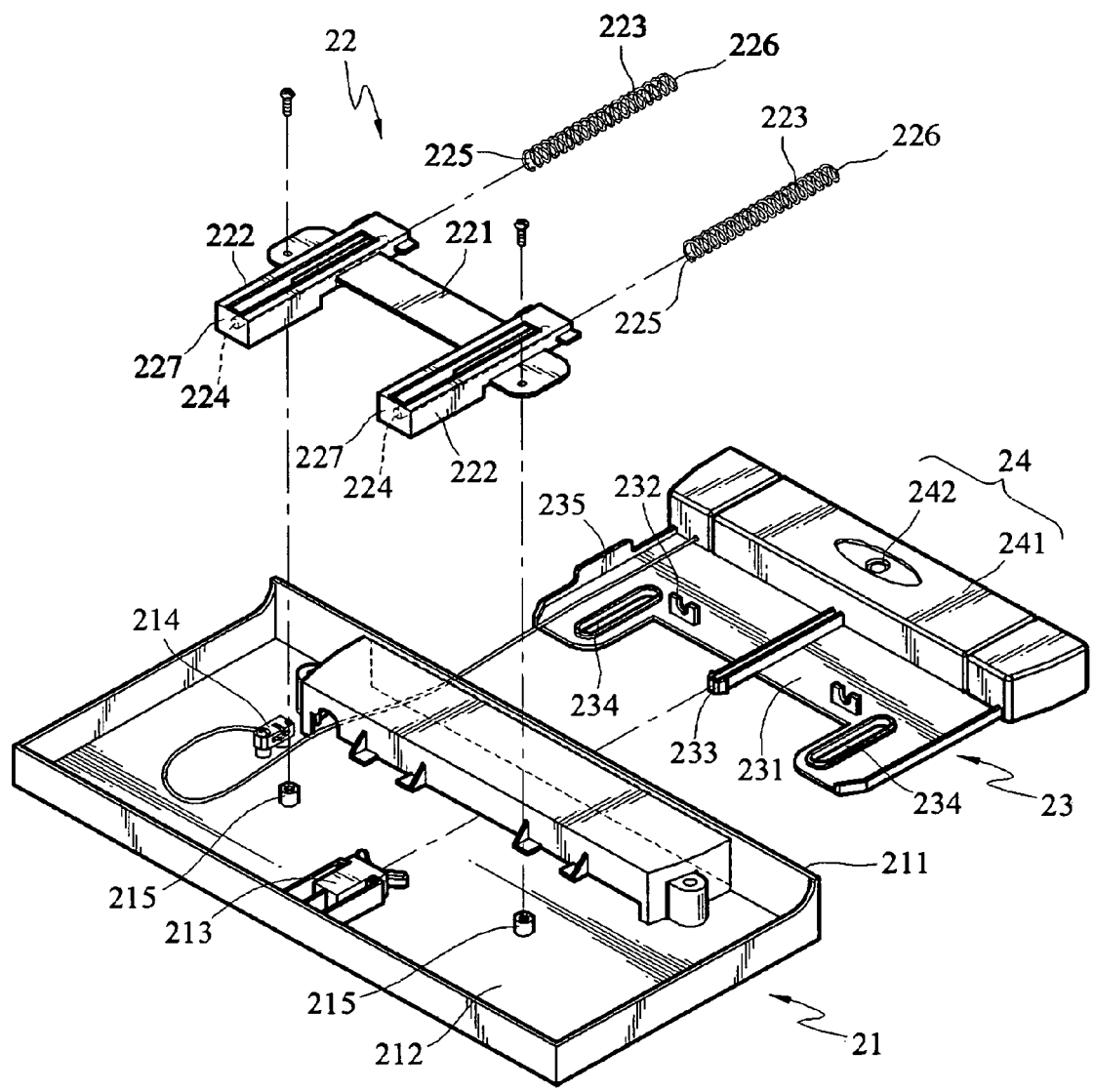
FIG. 3 is a three-dimensional exploded view of the hidden image capturing device of the present invention.
Figure 4:
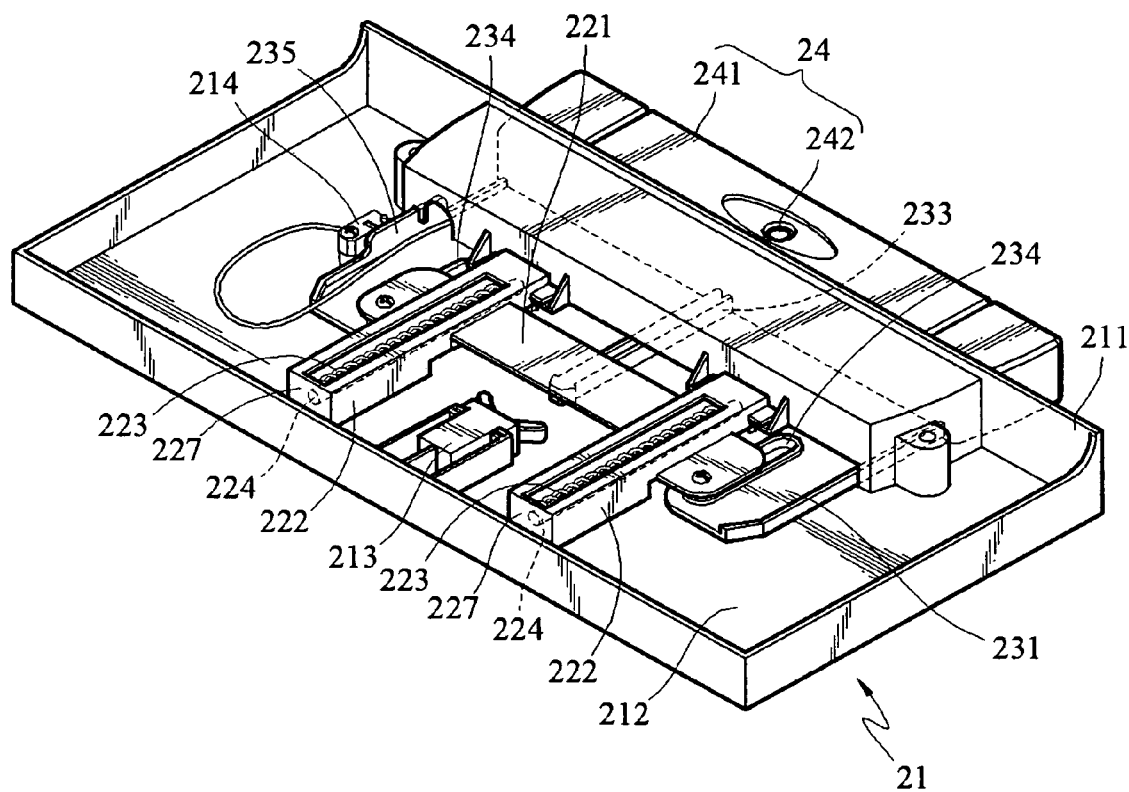
FIG. 4 is a three-dimensional assembled view of the hidden image capturing device of present invention.

As shown in FIG. 3 and FIG. 4, a three-dimensional exploded view and a three-dimensional assembled view of the hidden image capturing device are shown respectively. The display 10 includes at least a first shell 21, a control module 22, a slide module 23, and an image capturing module 24.

The first shell 21 is the outer case of the display 10, with at least a first panel 211 and a second panel 212. In addition, the first panel 211 is provided with a buckle member 213. When the display 10 is placed on a desk, the first panel 211 refers to the panel surface on top of the first shell 21. On the other hand the second panel 212 refers to the panel surface on the bottom of the first shell 21. Generally speaking, the first panel 211 and second panels 212 are integrally formed, in a roughly perpendicular configuration. The buckle member 213 is a push-type buckle with a buckle opening. Besides, shafts 215 are disposed at the positions corresponding to that of each slide groove 234 of the second panel 212.

The control module 22 has a fix board 221, at least one stand 222, and at least one contractible member 223.

The fix board 221 is a flat board, and it is fixed on the second panel 212 by the shafts 215 and kept a distance away from the second panel 212. The shaft 215 is an object with specific width and height. Its width just fits the slide groove 234, so that the slide module 23 can slide in the slide groove 234 smoothly, and its height has to let the fix board 221 keeps a distance away from the first shell 21. The distance is used to provide a space for the slide module 23 moving.

The stands 222 are fixed on the fix board 221 and it is a rectangular hollow bar. A guide rod 224 is disposed on the inner side of each stand 222. The guide rod 224 is suspended in the stand 222 to let the contractible member 223 install in the guide rod 224. Moreover, the axial orientation of each stand 222 is parallel to the sliding direction of the slide module 23.

Each of the contractible members 223, such as a spring, is slipped on the guide rod 224 respectively. It has a first end 225 and a second end 226. Also, the first end 225 is in touch with the inner side of a stand bottom 227. When the image capturing element 242 is not in use, the slide module 23 slides toward the lower side of the display 10. Therefore, the contractible member 223 is compressed. On the other hand, when the image capturing element 242 is in use, the slide module 23 slides toward the upper side of the display 10. Therefore, the image capturing element 242 can be extended out by the contractible member 223.

The slide module 23 comprises a slide board 231, at least one clamp member 232, and a combining member 233.

The slide board 231 is a flat board and disposed between the second panel 212 and the fix board 221. Sliding grooves 234 are respectively formed at the places corresponding to each shaft 215 on the slide board 231. Each shaft 215 is disposed inside the slide groove 234 and in touch with the two inner sides of the slide groove 234 by its outer edge in a movable way. The combination of the slide grooves 234 and the shafts 215 enables the slide board 231 to slide within a fixed range of the opening of the slide grooves 234. When the top end of the opening of the slide groove 234 of the slide board 231 is in touch with the shaft 215, the image capturing module 24 reaches its stored position. On the other hand, when the lower end of the opening of the slide groove 234 of the slide board 231 is in touch with the shaft 215, the image capturing module 24 reaches its activation position. The size of the opening of the slide groove 234 is the range that the image capturing module 24 reaches its activation position when being use and aligns with the surface of the first panel 211 when being stored.

Each of the clamp members 232 is disposed on the slide board 231 at a position corresponding to that of each second end 226 of the contractible member 223 respectively. The clamp member 232 has an opening, so that the guide rod 224 can be moved therein; therefore, when the image capturing element 242 is in a stored status, the slide board 231 moves toward the lower side of the display 10, and the clamp member 232 moves with the slide board 231 in the same direction. Besides, the second ends 226 of the contractible members 223 are respectively disposed at the clamp members 232. Therefore, as the clamp member 232 moves with the slide board 231 in the same direction, the contractible member 223 is compressed to an energy-storing state.

The combining member 233 is fixed on the slide board 231 at a position corresponding to that of the buckle member 213. The combining member 233 and the buckle member 213 can be easily connected together or separated. The combining member 233 is a rod. Since it is disposed on the slide board 231, it moves with the slide board 231 in the same axial direction. The end of the combining member 233 is provided with a combining buckle, so that the combining buckle can be inserted into the opening of the buckle member 213 to buckle up. Therefore, when the image capturing element 242 is not in use, the slide board slides toward the lower side of the display 10 and thereby gets fixed. The energy-storing state of the contractible member 223 is thus maintained.

Once a user wants to use the image capturing element 242, the user can push the shell of the image capturing module 24. The force of the push is transferred by the image capturing module 24 to the slide board 231, and then to the combining member 233. Since the buckle member 213 is a push-push connector, the combining member 233 and the buckle member 213 will depart from each other when a force is imposed thereon, and the contractible member 223 in the energy-storing state extends. The slide board 231 is pushed toward the upper side of the display 10, so as to let the image capturing module 24 out of the first panel 211.

The image capturing module 24 is disposed on the slide board 231. It has a second shell 241 provided with an image capturing element 242. The image capturing module 24 is mainly composed of an image capturing element 242 and a conventional control circuit coupled to the image capturing element 242. The image capturing element 242 may be a charge-coupled device (CCD) or a complementary metal-oxide semiconductor (CMOS) device.

Figure 5A:
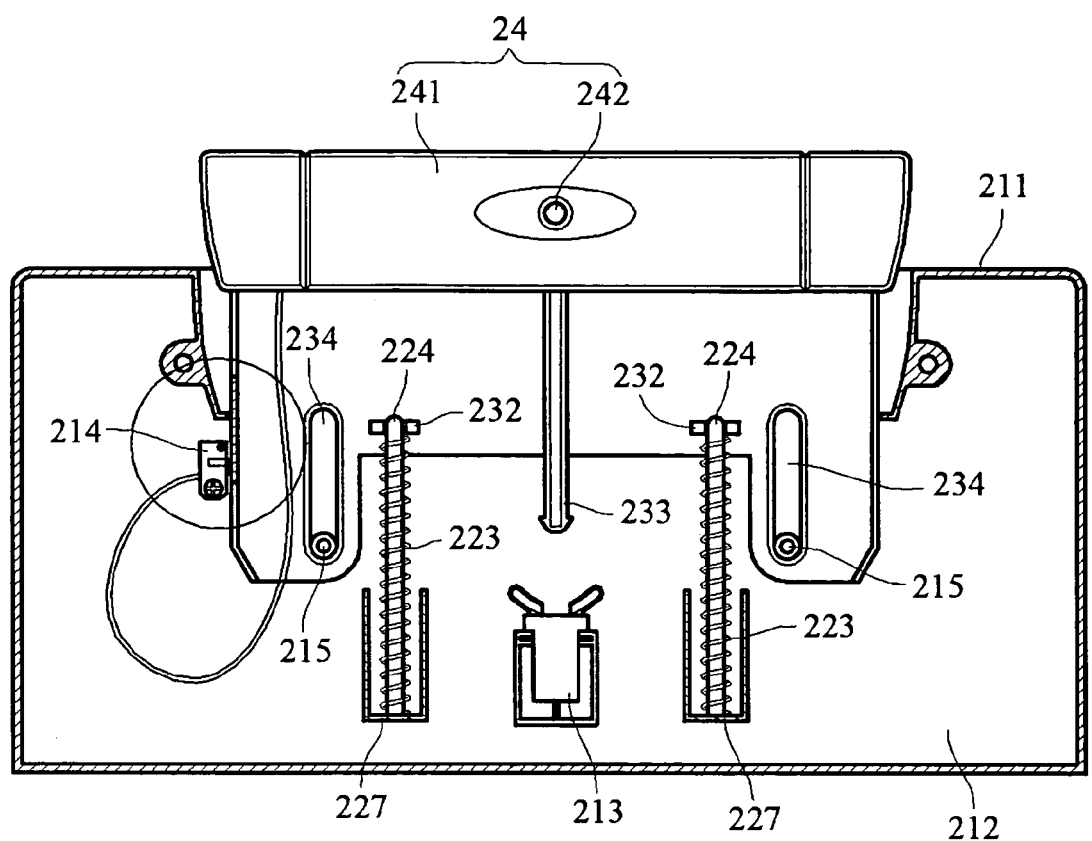
FIG. 5A shows the other embodiment of a hidden image capturing device when it is stored according to the invention.
Figure 5B:
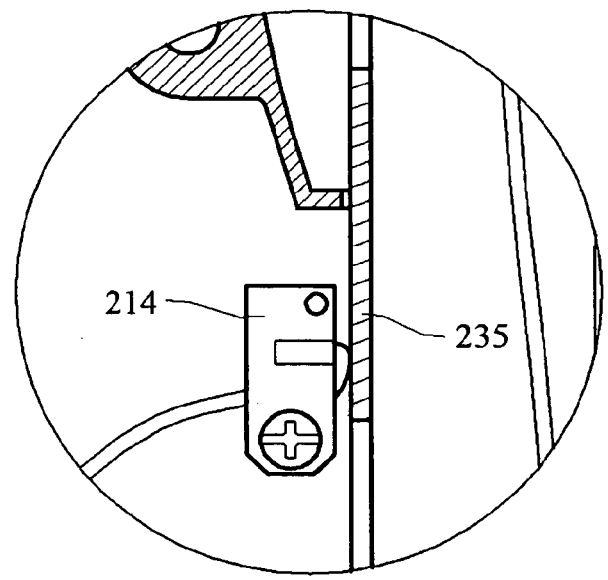
FIG. 5B shows how an actuating plate in FIG. 5A turns off a switch.

Please refer to FIGS. 5A and 5B, the other embodiment of a hidden image capturing device when it is stored and how an actuating plate turns off a switch are shown. When the user is not using the image capturing element 242, for reasons of saving power and showing the status of the image capturing element 242 on a user interface, an actuating plate 235 is provided on one side end of the slide board 231 of the slide module 23. The actuating plate 235 slides with the slide board 231 in the same axial direction, so that a switch 214 (e.g. a micro switch) can be disposed on the second panel 212 beside the moving line of the actuating plate 235. Therefore, when the image capturing element 242 is not in use, the slide board 231 slides toward the lower side of the display 10, driving the actuating plate 235 to turn off the switch 214.

Figure 6A:
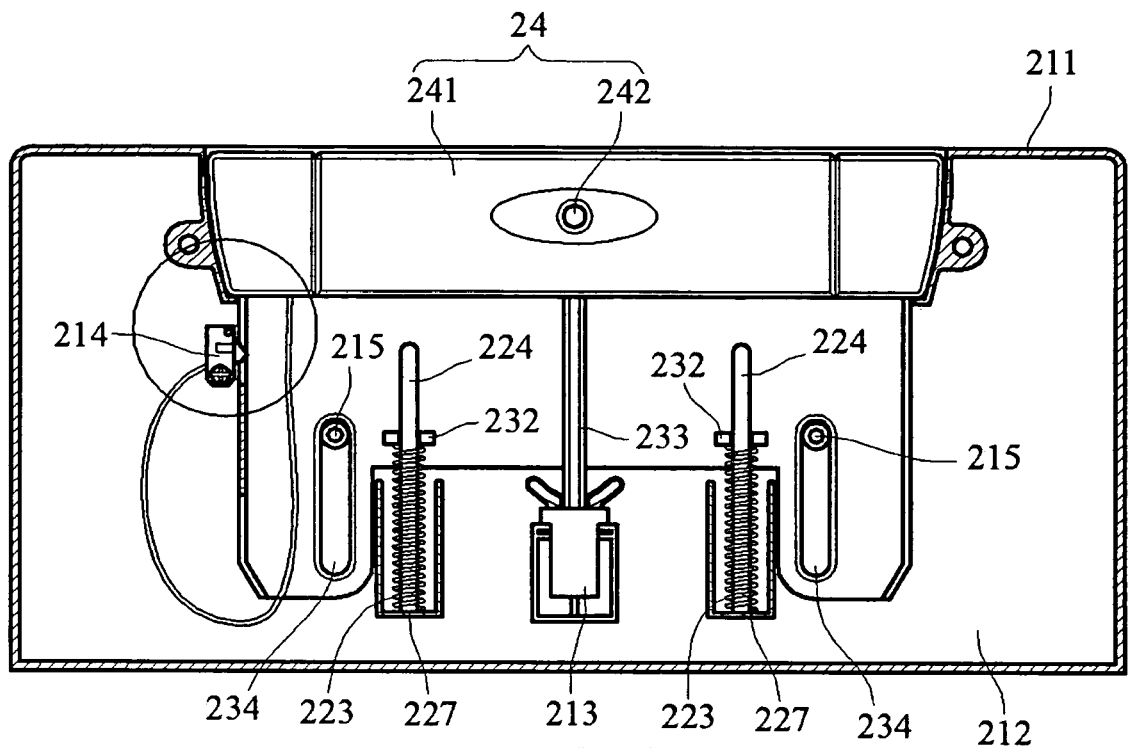
FIG. 6A shows the other embodiment of a hidden image capturing device when it is activated according to the present invention.
Figure 6B:
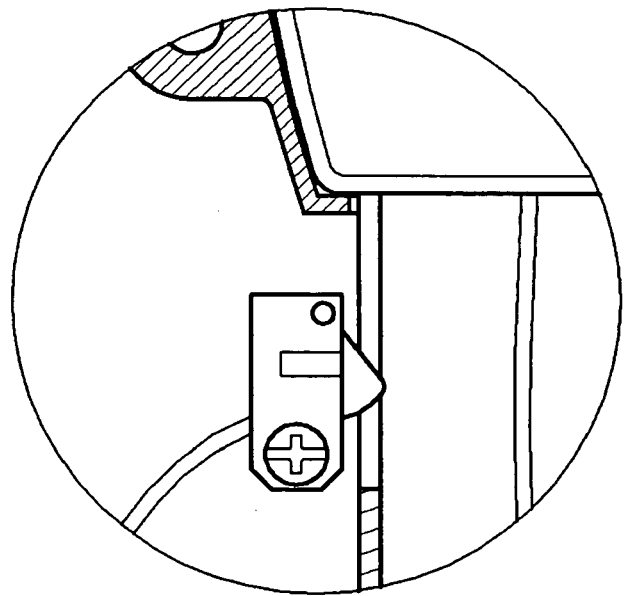
FIG. 6B shows how an actuating plate in FIG. 6A turns on a switch.

On the other hand, please refer to FIGS. 6A and 6B, a hidden image capturing device when it is activated and how an actuating plate in FIG. 6A turns on a switch are shown. If the image capturing element 242 is in use, the slide board 231 slides toward the upper side of the display 10, driving the actuating plate 235 to turn on the switch 214. Since the switch 214 is electrically coupled to and controlling the control circuit (not shown) of the image capturing module 24, the on or off of the switch 214 serves as a means for the control circuit to activate or store the image capturing element 242, so that the user can see the status of the status of the hidden image capturing device through the user interface.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hidden image capturing device applied to a display, comprising:
    a first shell having a first panel and a second panel, the first panel being provided with a buckle member and the second panel being formed with an opening for accommodating a second shell and a shaft;
    a control module including:
        a fix board, fixed onto the second panel by the shaft and kept a distance away from the second panel;
        at least one stand, which is a rectangular hollow shell, fixed on the fix board, the inner side of each stand being disposed with a guide rod suspended in the stand; and
        at least one contractible member, each slipped onto the corresponding guide rod and having a first end and a second end, the first end being in touch with a stand bottom;
    a slide module including:
        a slide board, which is a flat board disposed between the second panel and the fix board, having a slide groove at the position corresponding to the shaft so that the shaft is disposed in the slide groove;
        at least one clamp member, disposed on the slide board at the position corresponding to the second end of each contractible member and having an opening for the guide rod to pass through and move therein; and a combining member, fixed on the slide board at the position corresponding to the buckle member for connecting with the buckle member in a connected or separated way; and an image capturing module, disposed on the slide board, having a second shell, the second shell being installed with an image capturing element.

2. The hidden image capturing device as in claim 1, wherein the buckle member is a push-push connector.

3. The hidden image capturing device as in claim 1, wherein the contractible member is a spring.

4. The hidden image capturing device as in claim 1, wherein the image capturing element is a charge-coupled device image capturing device.

5. The hidden image capturing device as in claim 1, wherein the image capturing element is a complementary metal-oxide semiconductor image capturing device.

6. The hidden image capturing device as in claim 1, wherein one end of the slide board is formed with an actuating plate and a switch is formed beside the actuating plate, and the switch is electrically coupled to a control circuit.

7. The hidden image capturing device as in claim 6, wherein the switch is a micro switch.

8. The hidden image capturing device as in claim 1, wherein the outer edge of the shaft is in touch with the inner edges of the slide groove in a movable way.

9. The hidden image capturing device as in claim 1, wherein when the top end of the opening of the slide groove is in touch with the shaft, the image capturing module reaches its stored position.

10. The hidden image capturing device as in claim 1, wherein when the lower end of the opening of the slide groove is in touch with the shaft, the image capturing module reaches its activation position.

* * * * *